US006947611B2

(12) United States Patent
Kawakami et al.

(10) Patent No.: US 6,947,611 B2
(45) Date of Patent: Sep. 20, 2005

(54) SYSTEM, METHOD AND PROGRAM FOR PERSPECTIVE PROJECTION IMAGE CREATION, AND RECORDING MEDIUM STORING THE SAME PROGRAM

(75) Inventors: Kenichi Kawakami, Nara (JP); Kiyoshi Kumata, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 678 days.

(21) Appl. No.: 10/141,900

(22) Filed: May 9, 2002

(65) Prior Publication Data
US 2002/0181803 A1 Dec. 5, 2002

(30) Foreign Application Priority Data
May 10, 2001 (JP) ........................................ 2001-140779

(51) Int. Cl.⁷ ................................................. G06K 9/32
(52) U.S. Cl. ........................ 382/293; 345/607; 345/660; 340/932.2; 340/435
(58) Field of Search ................................ 382/293, 294, 382/295, 298, 299, 300, 285; 345/660, 664, 667, 607; 356/614, 635, 636; 359/867–869; 340/932.2, 435

(56) References Cited

U.S. PATENT DOCUMENTS

| | | | | |
|---|---|---|---|---|
| 4,774,678 A | * | 9/1988 | David et al. | 345/667 |
| 5,020,114 A | * | 5/1991 | Fujioka et al. | 382/285 |
| 5,185,667 A | * | 2/1993 | Zimmermann | 348/207.99 |
| 5,740,224 A | * | 4/1998 | Muller et al. | 378/11 |
| 5,757,290 A | * | 5/1998 | Watanabe et al. | 340/995.14 |
| 5,835,641 A | * | 11/1998 | Sotoda et al. | 382/291 |
| 6,118,474 A | * | 9/2000 | Nayar | 348/36 |
| 6,141,014 A | * | 10/2000 | Endo et al. | 345/427 |
| 6,219,463 B1 | * | 4/2001 | Hyodo | 382/298 |
| 6,344,805 B1 | * | 2/2002 | Yasui et al. | 340/932.2 |
| 6,424,355 B2 | * | 7/2002 | Watanabe et al. | 345/668 |
| 6,476,730 B2 | * | 11/2002 | Kakinami et al. | 340/932.2 |
| 6,574,376 B1 | * | 6/2003 | Shiota et al. | 382/293 |
| 2001/0015751 A1 | * | 8/2001 | Geng | 348/36 |

FOREIGN PATENT DOCUMENTS

| | | | |
|---|---|---|---|
| EP | 1 158 473 A2 | 11/2001 | ......... G08B/13/193 |
| JP | 06-295333 | 10/1994 | .......... G06F/15/64 |
| JP | 09-118178 | 5/1997 | ............ B60R/1/00 |
| JP | 10-211849 | 8/1998 | ............. B60R/1/00 |
| JP | 2000-128031 | 5/2000 | .......... B62D/41/00 |
| WO | WO 00/64175 | 10/2000 | ............ H04N/7/18 |

OTHER PUBLICATIONS

Yagi et al., IEEE, 1996, "Rolling motion estimation for mobile robot by using omnidirectional image sensor Hyper-OmniVision". (pp. 946–950).*
Yachida et al., IEEE, 1998, "Omnidirectional sensing and combined multiple sensing". (pp. 1–8).*
Yachida et al., IEEE, 2000, "Super–resolution from an omnidirectional image sequence". (pp. 2559–2564).*
Korean Official Action dated Sep. 22, 2004.
European Search Report dated Feb. 16, 2004.

* cited by examiner

Primary Examiner—Joseph Mancus
Assistant Examiner—Manav Seth
(74) Attorney, Agent, or Firm—David G. Conlin; John J. Penny, Jr.; Edwards & Angell, LLP (57) ABSTRACT

A perspective projection image creation system of the present invention includes: an optical system including a hyperboloidal mirror; an imaging section receiving light so as to create input image data; an image transformation section transforming input image data obtained by the imaging section into image data of a perspective projection; a scale model creation section transforming image data for an object in an object plane into image data for a scale model of the object such that a size of the scale model of the object corresponds to that of the object in a perspective projection image; an image combining section creating combined image data created by combining the perspective projection image data and the image data for the scale model; and a display section displaying the combined image data.

11 Claims, 8 Drawing Sheets

SYSTEM, METHOD AND PROGRAM FOR PERSPECTIVE PROJECTION IMAGE CREATION, AND RECORDING MEDIUM STORING THE SAME PROGRAM

BACKGROUND OF THE INVENTION

1. Field of the Invention

The present invention relates to a perspective projection image creation system including an omnidirectional vision sensor, a perspective projection image creation method, a perspective projection image creation program and a recording medium storing the perspective projection image creation program.

2. Description of the Related Art

In recent years, studies have been actively carried out for an image display system including a camera and a monitor installed in a mobile body, such as a car, so as to display an image in a driver's blind spot on the monitor. A representative example of such an image display system includes a rearview monitor installed in a car so as to reduce the burden imposed on a driver, for example, when the driver parks the car.

However, in a conventional image display system, for example, an angle of view is narrow right behind the car, so that information displayed on a monitor is limited. Therefore, there is a need for an image display system including a camera which has a wider angle of view and can obtain more accurate information on a positional relationship between a car and obstacles, in order to further reduce the driver's burden.

Moreover, in a conventional image display system such as an image display system including a rearview monitor, an image captured by a camera is displayed on a display screen of the monitor substantially without being processed, so that a range covered by the displayed image is limited to a specific field of view, for example, in an area behind a car. With the conventional image display system, a driver of the car can observe obstacles located directly behind the car or the driver can recognize how far the car can be backed up. However, the driver cannot obtain information on the surroundings except in the area directly behind the car, e.g., the driver cannot recognize a positional relationship between the car and obstacles or the like, such as lines indicating a parking space or adjacent cars parked next to the driver's car.

Therefore, the driver of the car is required to drive or park the car by making good use of their driving experience while checking the image displayed on the monitor or looking in rearview and/or side mirrors. This imposes a considerable burden on an inexperienced driver and prevents the driver's safety driving.

In view of the above-described circumstances, there is a need for an image display system used as a driving assistance system which provides a driver of a car with accurate positional information on the surroundings around the car, for example, in a car park. Japanese Patent Application No. 2000-31260 discloses a mobile body surround surveillance apparatus which includes an omnidirectional vision sensor using a hyperboloidal mirror installed at a prescribed position in a car such that a field of view of the omnidirectional sensor is directed downward to the ground plane, i.e., the omnidirectional sensor captures an image of the ground as if the ground is viewed from directly above. That is, the mobile body surround surveillance apparatus produces a bird's eye view of the ground based on a perspective projection image obtained by the omnidirectional vision sensor, thereby providing two-dimensional information on a position of a mobile body, such as a car, with respect to the ground plane.

However, such a conventional mobile body surround surveillance apparatus disclosed in Japanese Patent Application No. 2000-31260 produces the bird's eye view using the perspective projection image as if the car, which does not actually exist on the ground plane, does exist on the ground plane, so that the bird's eye view of the car is significantly distorted, making it difficult to judge a positional relationship between the car and the ground plane, and therefore obstacles located thereon.

Japanese Patent Application No. 2000-31260 also discloses a configuration which enables the positional relationship between the car and the ground plane to be accurate and obvious in the bird's eye view by combining the distorted image of the car on the bird's eye view with an image showing the car as if the car is viewed from above. However, Japanese Patent Application No. 2000-31260 does not give detailed description of a method for producing such a combined image, which is, in fact, produced by a driver of the car repeating adjustments of a display screen through trial-and-error while viewing the display screen. Therefore, it is not easy for the driver to make slight changes, such as zooming-in or zooming-out, to the displayed image. Furthermore, no mechanism is provided to enable the driver to recognize an actual distance from the car to obstacles, lines indicating a parking space, etc.

SUMMARY OF THE INVENTION

According to one aspect of the present invention, there is provided a perspective projection image creation system which includes: an optical system including a hyperboloidal mirror which has a hyperboloidal shape of one sheet of a two-sheeted hyperboloid; an imaging section receiving light concentrated by a lens opposed to the hyperboloidal mirror so as to create input image data; an image transformation section transforming input image data obtained by the imaging section into image data of a perspective projection having a projection center at a focal point of the hyperboloidal mirror; a scale model creation section transforming image data for an object in an object plane perpendicular to a line extending through a focal point of the hyperboloidal mirror into image data for a scale model of the object, based on a ratio of a distance between the focal point of the hyperboloidal mirror and the object plane to a distance between the focal point of the hyperboloidal mirror and a perspective projection image plane, such that a size of the scale model of the object corresponds to that of the object in a perspective projection image; an image combining section creating combined image data created by combining the perspective projection image data and the image data for the scale model; and a display section displaying the combined image data.

In one embodiment of this invention, the object plane is a ground plane.

In one embodiment of this invention, the distance between the projection center and the perspective projection image plane is represented by the number of pixels each of which represents a minimum unit of resolution of an image.

In one embodiment of this invention, the image data of the scale model is created based on information with respect to a target object for the scale model in the object plane.

In one embodiment of this invention, the information includes original image data, which is the image data for the target object, an actual size of the target object, and data with respect to the distance between the focal point of the hyperboloidal mirror and the object plane.

In one embodiment of this invention, the scale model creation section creates the image data of the scale model by enlarging/reducing a size of the original image data, which is the image data for a target object, based on the ratio of the distance between the focal point of the hyperboloidal mirror and the object plane to the distance between the focal point of the hyperboloidal mirror and a perspective projection image plane.

In one embodiment of this invention, the perspective projection image creation system further includes a second optical system similar to the first optical system, the system creating perspective projection image data, which has a projection center at a focal point of a hyperboloidal mirror in the second optical system and corresponds to the scale model, by calculating a distance between the focal point of the hyperboloidal mirror in the second optical system and a perspective projection image plane having a projection center at the focal point in the second optical system based on the image data for the scale model created by the scale model creation section.

In one embodiment of this invention, the image data for the scale model is a gauge model representing a length in an image.

According to another aspect of the present invention, there is provided a method for creating a perspective projection image which includes the steps of: obtaining input image data using an omnidirectional vision sensor, the omnidirectional sensor including an optical system which includes a hyperboloidal mirror having a hyperboloidal shape of one sheet of a two-sheeted hyperboloid and the omnidirectional sensor including an imaging section which receives light concentrated by a lens opposed to the hyperboloidal mirror so as to create input image data; transforming input image data obtained by the imaging section into image data of a perspective projection having a projection center at a focal point of the hyperboloidal mirror; creating a scale model by transforming image data for an object in an object plane perpendicular to a line extending through a focal point of the hyperboloidal mirror into image data for a scale model of the object, based on a ratio of a distance between the focal point of the hyperboloidal mirror and the object plane to a distance between the focal point of the hyperboloidal mirror and a perspective projection image plane, such that a size of the scale model of the object corresponds to that of the object in a perspective projection image; combining the perspective projection image data and the image data for the scale model so as to create combined image data created; and displaying the combined image data.

According to still another aspect of the present invention, there is provided a perspective projection image creation program for carrying out the method for creating perspective projection image.

According to still another aspect of the present invention, there is provided a computer readable recording medium storing a perspective projection image creation program for carrying out the method for creating a perspective projection image.

Thus, the invention described herein makes possible the advantages of providing: a perspective projection image creation system which can provide a perspective projection image accurately indicating a positional relationship between a car and objects captured in the image; a method for creating the perspective projection image; a program for creating the perspective projection image; and a recording medium storing the perspective projection image creation program.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.

A perspective projection image creation system according to the present invention produces a perspective projection image, which has a projection center at a focal point of a hyperboloidal mirror, based on input image data obtained by an omnidirectional vision sensor using the hyperboloidal mirror.

First, the omnidirectional vision sensor using the hyperboloidal mirror is described below.

An omnidirectional vision sensor using a hyperboloidal mirror is described in detail in Japanese Laid-Open Patent Publication No. 6-295333, the entirety of which is incorporated herein by reference, and thus only a feature of such an omnidirectional vision sensor is described herein.

Figure 1:
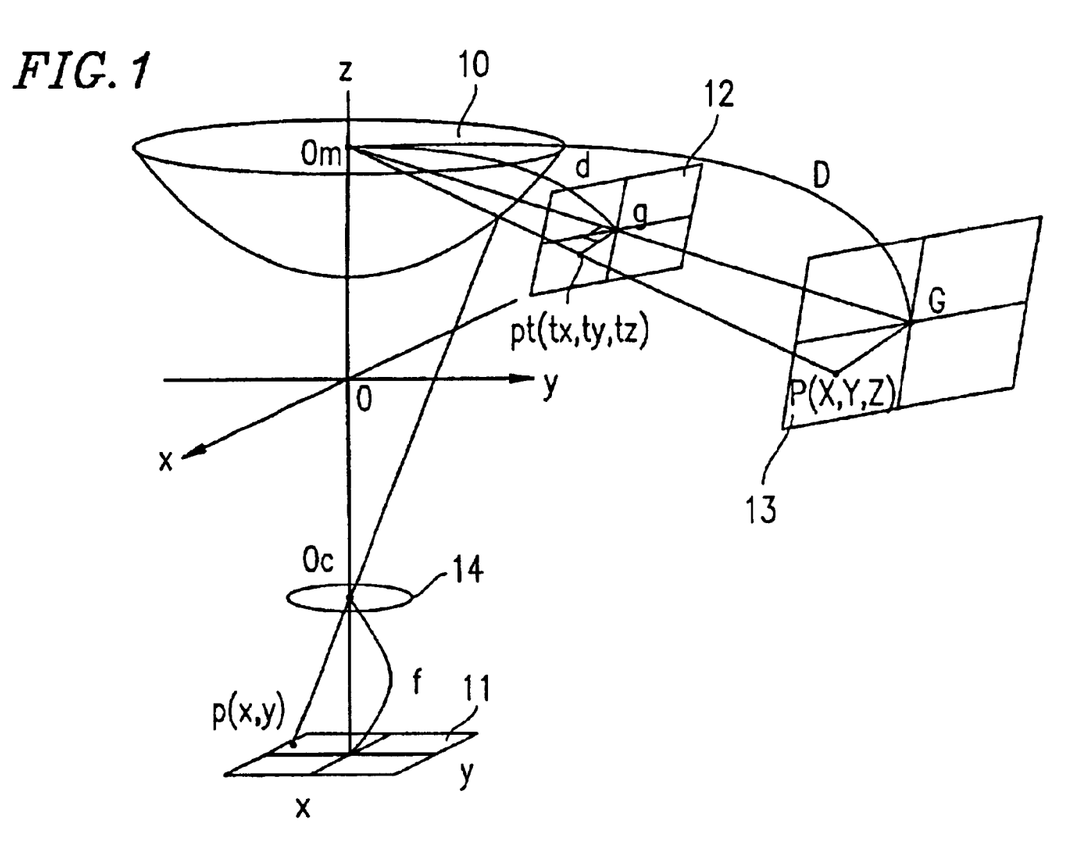
FIG. 1 is a schematic diagram for explaining an optical system of an omnidirectional vision sensor.

FIG. 1 is a diagram showing a structure of an optical system of the omnidirectional vision sensor.

As shown in FIG. 1, the optical system of the omnidirectional vision sensor includes a hyperboloidal mirror 10. The hyperboloidal mirror 10 includes a body of rotation having a reflection surface as an outer peripheral surface thereof. In FIG. 1, a rotation axis of the hyperboloidal mirror 10 is positioned at a z-axis in a three-dimensional coordinate system (x,y,z). Focal point Om of the hyperboloidal mirror 10 is located on the z-axis. Light emitted toward focal point Om of the hyperboloidal mirror 10 is reflected by the reflection surface of the hyperboloidal mirror 10 and is concentrated on point Oc on the z-axis. Point Oc corresponds to another focal point of a hyperboloid of two sheets including the hyperboloidal mirror 10. A lens 14 is positioned at point Oc. An image plane 11, which is a light receiving surface of, for example, an imaging device like a CCD, is positioned away from the lens 14 by focal distance f of the lens 14 so as to be perpendicular to the z-axis. Point Oc is a lens principal point of the lens 14.

In this optical system, consider light emitted from point P on a real space plane 13 toward focal point Om of the hyperboloidal mirror 10. The real space plane 13 includes point G located away from focal point Om of the hyperboloidal mirror 10 by distance D, the real space plane 13 being perpendicular to a straight line extending from focal point Om to point G (a view direction). Point P is represented by (X,Y,Z) in x-y-z axial coordinates. The light emitted from point P toward focal point Om is reflected toward the lens principal point Oc of the lens 14 by the hyperboloidal mirror 10, so that the lens 14 forms an image at point p(x,y) on the image plane 11. The image formed at point p on the image plane 11 becomes an input image. In this optical system, the hyperboloidal mirror 10 is positioned at the peripheral surface of a body of rotation around the z-axis as a central axis, and thus the input image created from light reflected by the hyperboloidal mirror 10 is a circular image.

The following description relates to a perspective projection image produced by transforming partial information on the surroundings of an optical system into a perspective projection having a projection center at focal point Om of the hyperboloidal mirror 10 using an input image.

Now, consider a perspective projection image plane 12 which includes point g on line Om-G along a view direction of the real space plane 13, the projection image plane 12 being perpendicular to line Om-G. Point g on the perspective projection image plane 12 is away from focal point Om of the hyperboloidal mirror 10 by distance d, where the projection image plane 12 is parallel to the real space plane 13. In the case where there is no object which prevents light from traveling between the real space plane 13 and focal point Om and the perspective projection image plane 12 has a projection center at focal point Om, light emitted from point P(X,Y,Z) is projected onto projection point Pt(tx,ty,tz). As described above, light at point P(X,Y,Z) on the real space plane 13 forms an image at point p(x,y) on the image plane 11, and therefore the values of projection point pt(tx,ty,tz) are determined based on the values of point p(x,y). By calculating each value of the projection point on the perspective projection image plane 12 from those on the image plane 11, a perspective projection image having a projection center at focal point Om can be obtained.

In this case, as shown in FIG. 1, a triangle Om-g-pt formed by a line running through points g and pt on the perspective projection image plane 12 and focal point Om of the hyperboloidal mirror 10 and a triangle Om-G-P formed by points G and P on the real space plane 13 and focal point Om of the hyperboloidal mirror 10 have a common axis running through Om, g and G. The triangles Om-g-pt and Om-G-P have a common vertex angle. Accordingly, the triangles Om-g-pt and Om-G-P are similar triangles.

Thus, a ratio of a distance between points g and pt of the perspective projection image plane 12 to a distance between points G and P of the real space plane 13 is represented by a ratio d/D of a distance between focal point Om and point g of the perspective projection image surface 12 to a distance between focal point Om and the real space plane 13.

In the case where the perspective projection image is a digital image, it is convenient to represent a size of the digital image on the perspective projection image plane 12 by the number of pixels constituting the digital image. One pixel is a minimum unit of resolution of a digital image. By representing distance d between the perspective projection image plane 12 and focal point Om of the hyperboloidal mirror 10 by the number of pixels and representing a distance between any two points on the real space plane 13 by centimeters (cm), the distance ratio d/D can be represented by [pixel/cm], which means that the number of pixels required to represent a distance of one centimeter on the real space plane 13 is d/D.

Figure 2:
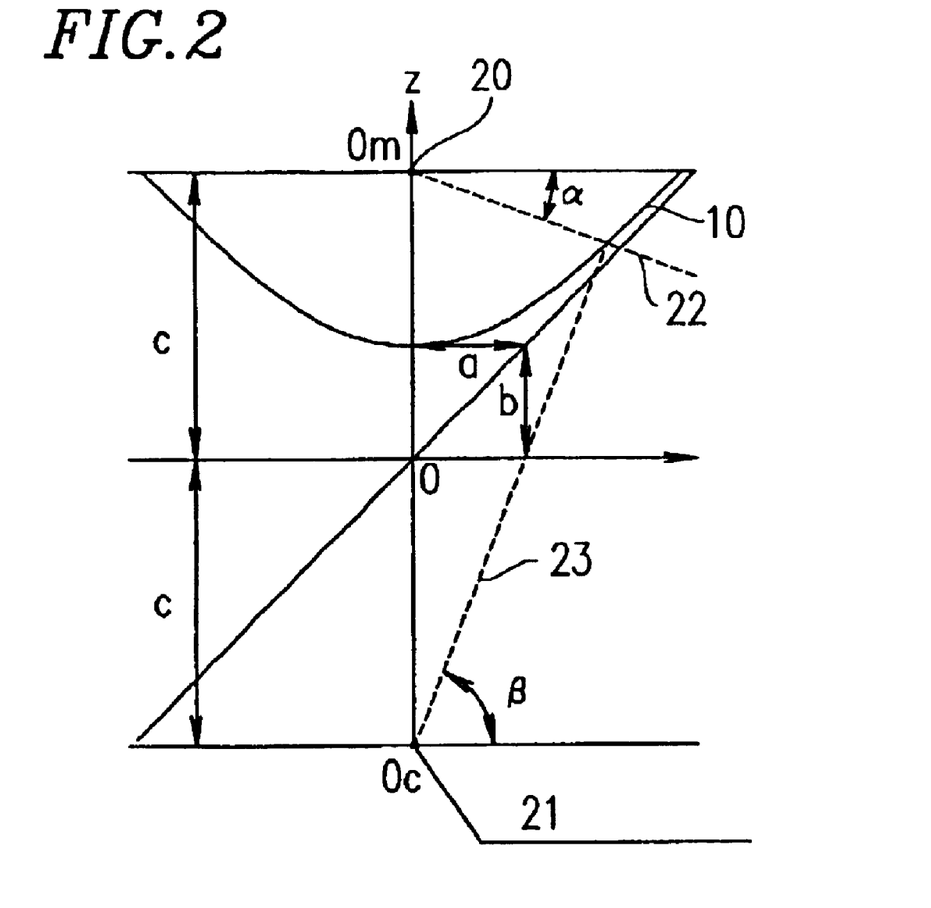
FIG. 2 is a view of a plane taken along a z-axis of the optical system of the omnidirectional vision sensor of FIG. 1.

FIG. 2 is a view of a plane taken along the z-axis of the optical system of the omnidirectional vision sensor of FIG. 1.

Considering the optical system in the plane including the z-axis, as shown in FIG. 2, a relationship between incident angle α of light 22 traveling toward focal point Om of the hyperboloidal mirror 10 and incident (reflection) angle β of light 23 reflected toward a lens principal point 21 is represented by following expression (1) using constants a, b and a defining the shape of the hyperboloidal mirror 10.

$$\alpha = \tan^{-1} \frac{(b^2 + c^2)\sin\beta - 2bc}{(b^2 - c^2)\cos\beta} \qquad (1)$$

According to expression (1), the incident angle β of the reflected light 23 is defined by the constants a, b and c defining the shape of the hyperboloidal mirror 10 and the incident angle a of the light 22.

Next, a perspective projection image creation system according to the present invention which uses the above-described omnidirectional vision sensor is described.

In the perspective projection image creation system according to the present invention, in order to represent a target object on the real space plane 13 having a known size, a size of an original image of the target object is enlarged or reduced, or a new image representing the object is produced using the distance ratio d/D, and a scale model of the target object is created so as to have a size corresponding to that of the perspective projection image surface 12.

This scale model is digital image data created so as to have a size which conforms to the distance ratio d/D, in order to represent the target object, which has a known size on the real space plane 13, on the perspective projection image plane 12. For example, in the case where the omnidirectional vision sensor is installed in a car and the target object is a shadow of the car in the ground plane, by creating image data as the scale model representing a size of the car, a positional relationship between the car and obstacles in the ground plane can be recognized.

Figure 3:
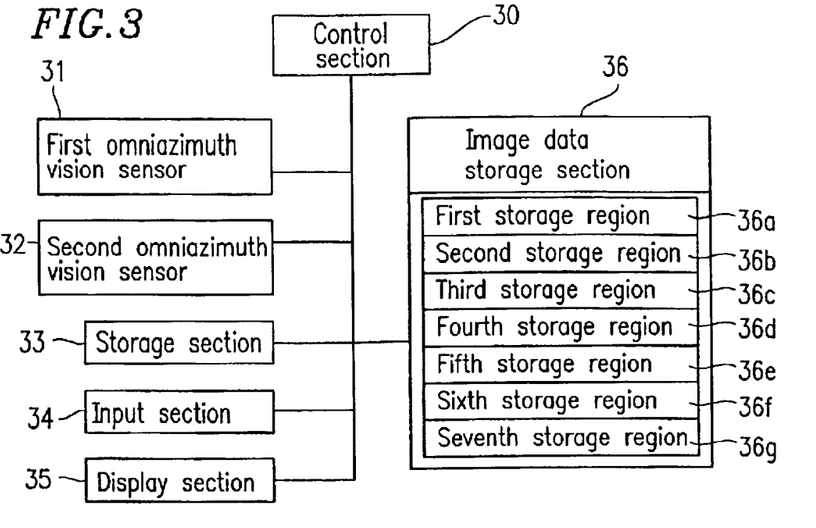
FIG. 3 is a block diagram for explaining a schematic structure of the perspective projection image creation system according to the present invention.

FIG. 3 is a block diagram for explaining a schematic structure of the perspective projection image creation system according to the present invention. An omnidirectional vision system for a car described in this embodiment includes an omnidirectional vision sensor having the optical system shown in FIG. 1 installed at each of the right front and left rear sides of a car so as to produce a bird's eye view of the car which assists a driver in driving the car.

As shown in FIG. 3, the perspective projection image creation system according to the present invention includes: a first omnidirectional vision sensor 31; a second omnidirectional vision sensor 32; a storage section 33 for storing data, with respect to the car including omnidirectional vision sensors, and the first and second omnidirectional vision sensors 31 and 32; an input section 34 used for inputting a variety of data; a display section 35 for displaying an image created based on outputs of the first and second omnidirectional vision sensors 31 and 32; an image data storage section 36 for temporarily storing data obtained by the first and second omnidirectional vision sensors 31 and 32; and a control section 30 for controlling all of these elements of the perspective projection image creation system.

Each of the above-described elements will be described below.

Figure 4:
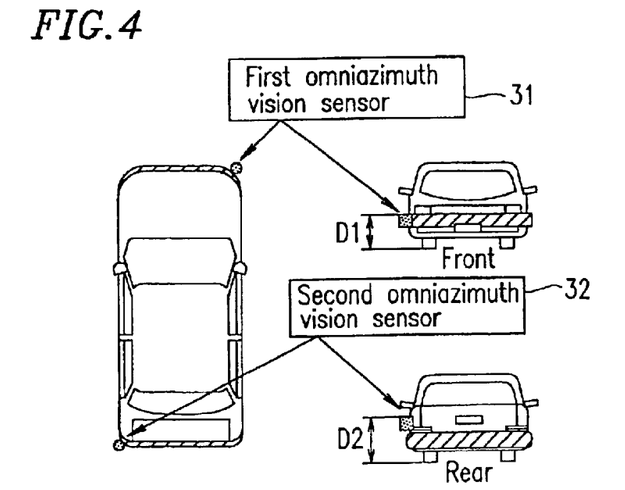
FIG. 4 is a schematic view of a car including omnidirectional vision sensors according to the present invention.

FIG. 4 is a schematic view of a car including the omnidirectional vision sensors according to the embodiment shown in FIG. 3.

As shown in FIG. 4, the first omnidirectional vision sensor 31 is positioned at the right front of the car including the omnidirectional vision sensors such that a CCD (an image plane) faces upward in a vertical direction with respect to the ground plane, a curved surface of a hyperboloidal mirror of the first omnidirectional vision sensor 31 positioned above the CCD camera faces downward in a vertical direction with respect to the ground plane, and a distance between the ground plane and a focal point of the hyperboloidal mirror is D1. The first omnidirectional vision sensor 31 obtains data on an image captured at the right front of the car as first input image data.

The second omnidirectional vision sensor 32 is positioned at the left rear of the car such that a CCD camera (an image plane) faces upward in a vertical direction with respect to the ground plane, a curved surface of the hyperboloidal mirror of the second omnidirectional vision sensor 32 positioned above the CCD camera faces downward in a vertical direction with respect to the ground plane, and a distance between the ground plane and a focal point of the hyperboloidal mirror is D2. The second omnidirectional vision sensor 32 obtains data on an image captured at the left rear of the car as second input image data.

The storage section 33 is a magnetic storage device, such as a magnetic disk, or a rewritable nonvolatile memory, etc., and stores information used for creating a scale model of the a car including the omnidirectional vision sensors displayed on a bird's eye view image, such as image data on the car including the omnidirectional vision sensors, values of actual width and total length of the car, distance D1 from the ground plane to the focal point of the hyperboloidal mirror of the first omnidirectional vision sensor 31, and distance D2 from the ground plane to the focal point of the hyperboloidal mirror of the second omnidirectional vision sensor 32. In this embodiment, a scale model of the car is created by enlarging or reducing a size of an image of the car based on information as described above. Thus, in order to produce a clear scale model, it is preferred that the storage section 33 has sufficient storage capacity so as to store a great deal of data with respect to an image of the car. This image data with respect to the car can also be created by using a graphics tool or an image of the car captured by a digital camera or the like from directly above the car can be used.

The input section 34 includes a user interface, such as a keyboard, a mouse, a remote control, or a touch panel, through which a driver can provide instructions, for example, by pressing a key or the like, while driving the car, so as to select a variable for zooming in on or zooming out from a displayed image, to select a gauge model, to designate display/non-display of the gauge model, and to designate display/non-display of a boundary line between the first and second omnidirectional vision sensors 31 and 32.

The image data storage section 36 is a memory for temporarily storing, for example, input image data obtained by the first and second omnidirectional vision sensors 31 and 32, and includes first through seven storage regions, i.e., storage regions 36a through 36g shown in FIG. 3.

The first storage region 36a stores the first input image data with respect to the surroundings of the right front of the car obtained by the first omnidirectional vision sensor 31. The second storage region 36b stores second input image data with respect to the surroundings of the left rear of the car obtained by second omnidirectional vision sensor 32.

The third storage region 36c stores first perspective projection image data created by transforming the first input image data stored in the first storage region 36a into perspective projection image data. The fourth storage region 36d stores second perspective projection image data created by transforming the second input image data stored in the second storage region 36b into perspective projection image data.

The fifth storage region 36e stores image data with respect to a scale model of the car created by enlarging or reducing a size of the image data on the car stored in the storage section 33.

The sixth storage region 36f stores image data for a gauge model representing a scale of an image with respect to the ground plane.

The seventh storage region 36g stores combined image data created by combining the first perspective projection image data stored in the third storage region 36c, the second perspective projection image data stored in the fourth storage region 36d, and the scale model of the car stored in the fifth storage region 36e. It should be noted that when the driver uses the input section 34 so as to select display of the gauge model stored in the sixth storage region 36f, the gauge model stored in the sixth storage region 36f is stored in the seventh storage region 36g together with the combined image data.

The display section 35 is a display device such as a liquid crystal display for use in a car navigator, etc., and displays an image represented by the combined image data.

The control section 30 is a computer storing a program for creating a bird's eye view (hereinafter, refered to as a "bird's eye view creation program 50") and controls the above-described elements of the omnidirectional visual system based on the stored bird's eye view creation program 50.

The bird's eye view creation program 50 stored in the control section 30 is described below.

Figure 5:
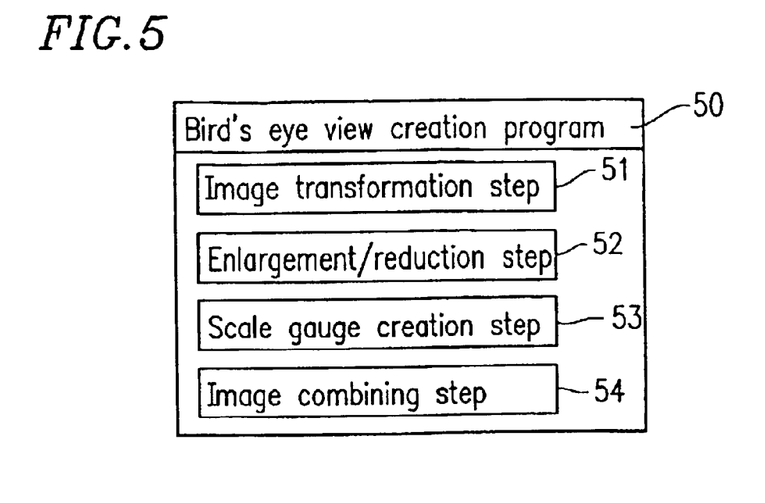
FIG. 5 is a view showing a schematic structure of a program stored in a control section of the omnidirectional visual system according to the present invention.

FIG. 5 is a view showing a schematic structure of the bird's eye view creation program 50 stored in the control section 30.

The bird's eye creation program 50 performs an image transformation step 51, an enlargement/reduction step 52, a scale gauge creation step 53, and an image combining step 54 on the various image data stored in the image data storage section 36 and the storage section 33.

In the image transformation step 51, perspective projection image data is created based on the first input image data which is obtained by the first omnidirectional vision sensor 31 and stored in the first storage regions 36a of the image data storage section 36 and the created perspective projection image data is stored in the third storage region 36c of the image data storage section 36. Similarly, different perspective projection image data is created based on the second input image data which is produced by the second omnidirectional vision sensor 32 and stored in the second storage regions 36b of the image data storage section 36 and the created perspective projection image data is stored in the fourth storage region 36d of the image data storage section 36. An algorithm used for creating the perspective projection image data in the image transformation step 51 is described in Japanese Laid-Open Patent Publication No. 6-295333, and thus detailed description thereof will be omitted.

In the enlargement and reduction step 52, the control section 30 reads original image data with respect to the car including the omnidirectional vision sensors from the storage section 33 and stores the data in the memory thereof. A scale model of the car is created by enlarging/reducing a size of the original image of the car. The created scale model of the car is stored in the fifth storage region 36e of the image data storage section 36. An algorithm used for creating this scale model is a conventionally and widely used image process method, such as an enlargement technique using an interpixel linear interpolation method and a reduction method which reduces pixel values or averages pixel values.

In the scale gauge creation step 53, image data for a gauge model in which a prescribed length, e.g., 1 m or 4 m, in an image is increased/decreased to a length of a prescribed scale. The created gauge model image data is stored in the sixth storage region 36f of the image data storage section 36. For example, in the case where information on a positional relationship between the a car including the omnidirectional vision sensors and a target object located at a right or left side of the car is requested, the gauge model image data is created so as to be a strip of full-color (24-bit) image data having a length corresponding to 1 m or 4 m and an arbitrary width.

In the image combination step 54, a bird's eye view image is created by combining the first perspective projection image data stored in the third storage region 36c, the second perspective projection image data stored in the fourth storage region 36d, image data with respect to the scale model of the car stored in the fifth storage region 36e, and the image data with respect to the gauge model stored in the sixth storage region 36f. The created bird's eye view is stored in the seventh storage region 36g of the image data storage section 36. Image data for the created bird's eye view image is sent to the display section 35 and the bird's eye view image is displayed by the display section 35.

Next, a method for creating the scale model and gauge model using the omnidirectional vision sensor according to the present invention is described in detail.

Figure 6:
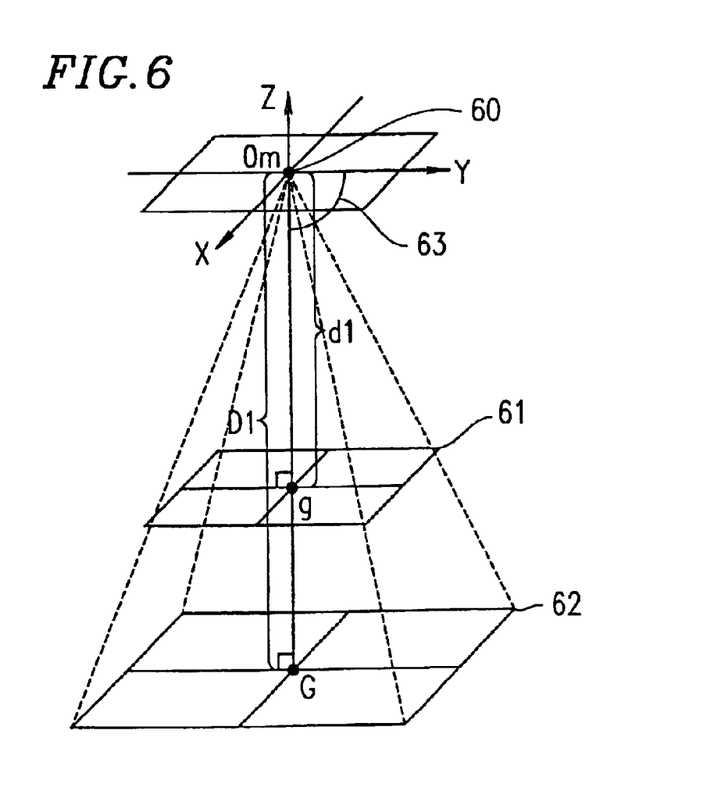
FIG. 6 is a perspective view showing a relationship between focal point Om of a hyperboloidal mirror of a first omnidirectional vision sensor with respect to a perspective projection image plane and an actual ground plane.

FIG. 6 is a perspective view showing a relationship between focal point Om of the hyperboloidal mirror 10 of the first omnidirectional vision sensor 31 with respect to a perspective projection image plane 61 and an actual ground plane 62. In this embodiment, straight lines Om-G and Om-g shown in FIG. 1 correspond to the z-axis and the first omnidirectional sensor 31 is positioned so as to be perpendicular to the ground plane 62, so that an angle of inclination of an XY plane including focal point Om as a center thereof with respect to the ground plane 62 is 0°. Accordingly, a tilt angle 63 between the straight line Om-g, which is a vertical axis of the perspective projection image plane 61, and the XY plane is −90°, so that the created perspective projection image plane 61 is parallel to the ground plane 62. In the omnidirectional vision sensor positioned in this manner, a distance between the perspective projection image plane 61 and focal point Om of the hyperboloidal mirror 10 is d1 and a distance between the ground plane 62 and focal point Om of the hyperboloidal mirror 10, i.e., a height at which focal point Om is located with respect to the ground plane 62, is D1. Distance D1 is calculated by measuring a height at which the first omnidirectional vision sensor 31 is attached to the car with respect to the ground plane 62. Distance D1 is stored in the storage section 33 and is read by the control section 30. A unit of distance d1 is represented by the number of pixels. A unit of D1 is represented by centimeters (cm). Distance d1 is used as a parameter when zooming-in on or zooming-out from an image using the input section 34.

As described above, the perspective projection image plane 61 and the ground plane 62 are similar to each other, and therefore, when a ratio d1/D1 of distance d1 to distance D1 is n1, n1 is represented by following expression (2).

$$n1 = \frac{d1}{D1} \, [\text{pixel/cm}], \tag{2}$$

where n1 represents the number of pixels required to display, on the perspective projection image plane 61, a length corresponding to 1 cm on the ground plane 62.

Figure 7:
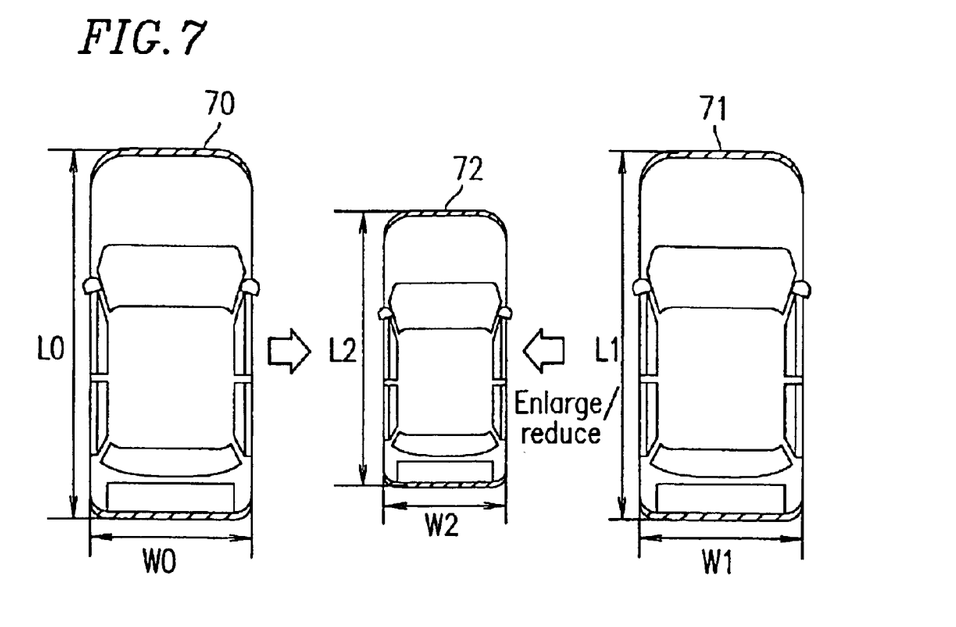
FIG. 7 is a plan view showing a representation of an actual size 70 of the car including the omnidirectional vision sensors, a size 71 of an original image of the car, and a scale model 72 of the car.

FIG. 7 is a plan view showing an actual size 70 of the car including the omnidirectional vision sensors, a size 71 of an original image of the car stored in the storage section 33, and the scale model 72 of the car created based on the original image 71. When the actual size 70 of the car is represented by W0 (width)×L0 (total length), the values of W0 and L0 represented by a unit of cm are stored in the storage section 33.

From expression (2), the width W2 and total length L2 of the scale model of the car represented by a unit of the number of pixels are respectively calculated by following expressions (3) and (4). An image size of the scale model 72 created by enlarging/reducing the size of the perspective projection image plane 61 is represented by W2×L2.

$$W2 = W0 \times n1 \tag{3}$$

$$L2 = L0 \times n1 \tag{4}$$

In the case where the image size of the original image 71 stored in the storage section 33 is W1×L1, the size of the original image 71 is required to be enlarged/reduced so as to be equal to the size of the scale model 72 of the car, i.e., W2×L2. A magnification ratio along the width direction of the scale model 72 to the original image 71 is W2/W1 and a magnification ratio along the length direction of the scale model 72 to the original image 71 is L2/L1.

According to this embodiment, in the image enlargement/reduction step 52, the original image 71 is transformed into an enlarged or reduced image having a size of W2×L2, and this enlarged/reduced image is used as a scale model in the perspective projection image plane 61.

Next, a method for creating a gauge model is described. In this embodiment of the present invention, creation of one-meter and four-meter gauge models is described.

The number of pixels in the perspective projection image plane 61 corresponding to the respective lengths of 1 m and 4 m in the ground plane 62 of FIG. 6 is represented by expressions (5) and (6).

$$1m = n1 \times 100 \quad (5)$$

$$4m = n1 \times 400 \quad (6)$$

Figure 8:
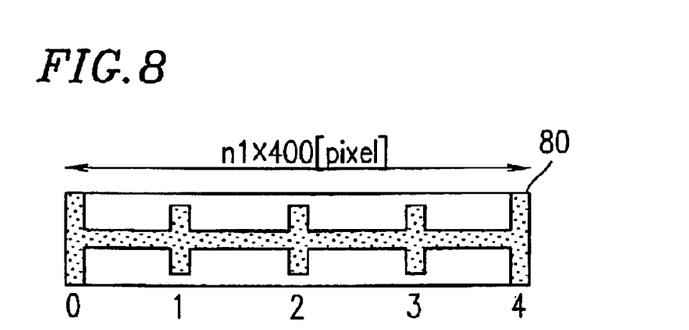
FIG. 8 is a schematic view showing a four-meter gauge model image.

FIG. 8 illustrates a four-meter gauge model created according to expression (6). This four-meter gauge model has a length of n1×400 [pixels] and intervals of one meter are indicated by breakpoints.

Next, the perspective projection image creation system according to this embodiment is described with reference to a program process flowchart of FIG. 9.

In step 1, whether or not the scale model of the car including the omnidirectional vision sensors is required to be changed is determined. If any change to the scale model of the car is determined to be required, then in step 2, values of the width and length of the car on an actual scale, image data for the car, and distance D1 between the ground surface and a focal point of a hyperboloidal mirror of two sheets of the first omnidirectional vision sensor 31 are read from the storage section 33 and input to the control section 30. In the control section 30, the enlargement/reduction step 52 (FIG. 5) is performed so as to create a scale model of the image of the car. The created scale model is stored in the fifth storage region 36e of the image data storage section 36.

Next, instep 3, the number of pixels in a one-meter or four-meter gauge model is calculated using expressions (5) or (6) and image data of the gauge model is created and stored in the sixth storage region 36f of the image data storage section 36.

In step 4, for either cases where the scale model is or is not required to be changed, the control section 30 reads first input image data obtained by the first omnidirectional vision sensor 31 from the storage region 36a of the image data storage section 36 and the image transformation step 51 (FIG. 5) is performed so as to create first perspective projection image data based on the first input image data. The created first perspective projection image data is stored in the third storage region 36c of the image data storage section 36.

Figure 10:
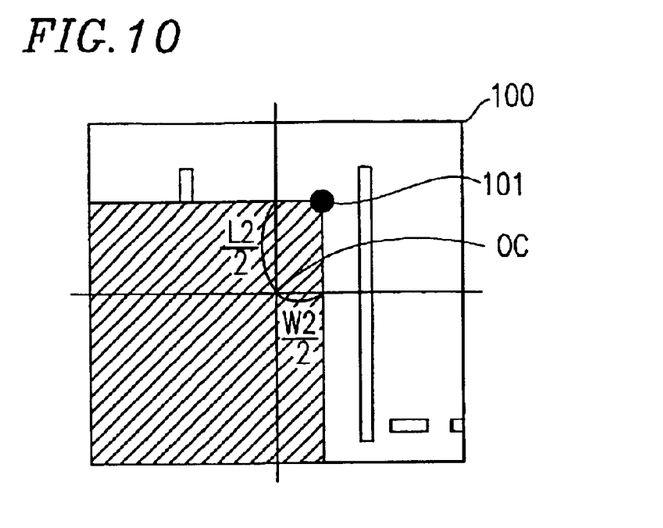
FIG. 10 is a perspective projection image created based on an input image captured by an omnidirectional vision sensor installed on the front side of a car including the omnidirectional vision sensors.

FIG. 10 is a schematic view showing a perspective projection image 100 created based on an input image captured by the first omnidirectional vision sensor 31. In FIG. 10, an image 101 of a CCD camera projected onto the hyperboloidal mirror of the first omnidirectional vision sensor 31 is projected onto the perspective projection image 100 and a center of the image 101 of the CCD camera corresponds to point g shown in FIG. 1.

In the image transformation step 51 (FIG. 5), the first input image data is transformed into the first perspective projection image data such that a coordinate at a center of the image 101 of the CCD camera is shifted to the right of the center point OC of the first perspective projection image by W2/2, which is a half of the width in the scale model of the car, and is shifted upward with respect to the center point OC of the first perspective projection image by L2/2, which is a half of the total length in the scale model of the car. Although the first omnidirectional vision sensor 31 is installed on the car including the omnidirectional vision sensors so as to have a focal point corresponding to the right front end of the car, in the case where the first omnidirectional vision sensor 31 is positioned so as to have a focal point away from the right front end of the car, a distance (cm) from the right front end of the car to the first omnidirectional vision sensor 31 is required to be calculated according to expression (2) such that the distance is represented by the number of pixels.

In the perspective projection image 100 of FIG. 10, a region located below and at the left of the camera image 101 (i.e., the hatched area shown in FIG. 10) corresponds to a shadow of the car, and therefore the ground plane in this region is not indicated as an image.

Next, referring again to FIG. 9, in step 5, the control section 30 reads the second input image data obtained by the second omnidirectional vision sensor 32 from the second storage region 36b of the image data storage section 36 and the image transformation step 51 is performed so as to create the second perspective projection image data based on the second input image data. The created second perspective projection image data is stored in the fourth storage region 36d of the image data storage section 36.

Figure 11:
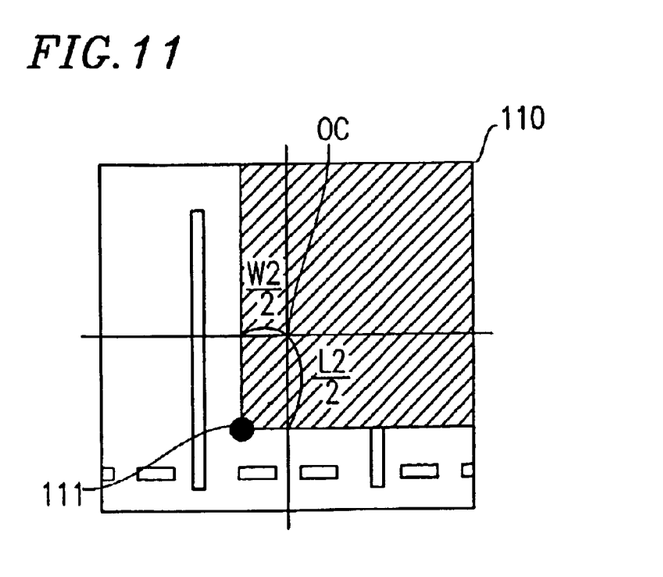
FIG. 11 is a perspective projection image created based on an input image captured by an omnidirectional vision sensor installed on the rear side of the car including the omnidirectional vision sensors.

FIG. 11 is a schematic view showing a perspective projection image 110 created based on an input image captured by the second omnidirectional vision sensor 32. In FIG. 11, an image 111 of a CCD camera projected onto the hyperboloidal mirror of the second omnidirectional vision sensor 32 is projected onto the perspective projection image 110 and a center of the image 111 of the CCD camera corresponds to point g shown in FIG. 1.

In the image transformation step 51 (FIG. 5), the second input image data is transformed into the second perspective projection image data such that a coordinate at a center of the image 111 of the CCD camera is shifted to the left of the center point OC of the second perspective projection image data by W2/2, which is a half of the width in the scale model of the car, and is shifted downward with respect to the center point OC of the second perspective projection image by L2/2, which is a half of the total length of the scale model of the car. Although the second omnidirectional vision sensor 32 is installed on the car including the omnidirectional vision sensors so as to have a focal point corresponding to the left rear end of the car, in the case where the second omnidirectional vision sensor 32 is positioned so as to have a focal point away from the left rear end of the car, a distance (cm) from the left rear end of the car to the second omnidirectional vision sensor 32 is required to be calculated according to expression (2) such that the distance is represented by the number of pixels.

In the perspective projection image 110 of FIG. 11, a region located above and at the right of the camera image 111 (i.e., the hatched area shown in FIG. 11) corresponds to a shadow of the car, and therefore the ground plane in this region is not indicated as an image.

As described above, when performing image transformation of the first and second input image, the scale model of the car is created based on distance d1 between the first perspective projection image plane of the first omnidirectional vision sensor 31 and focal point Om of the hyperboloidal mirror. Then, a distance between focal point Om of the hyperboloidal mirror of the second omnidirectional vision sensor 32 and the second perspective projection image plane is determined based on the created scale model of the car. When the ratio of a distance between the perspective projection image plane created in the second omnidirectional vision sensor 32 and the ground plane is n2, the following relationship represented by expression (7) is established.

$$n2 = \frac{d2}{D2} = \frac{W2}{W0} = \frac{L2}{L0} = n1 = \frac{d1}{D1} \quad (7)$$

In expression (7), a distance between the focal point of the hyperboloidal mirror and the (second) perspective projection image plane is d2, and a distance between the ground plane and the focal point of the hyperboloidal mirror is D2. Distance D2 is a constant defined by a position where the second omnidirectional vision sensor 32 is installed on the car and the constant is prestored in the storage section 33.

Since distance D2 is a constant, distance d2 between the focal point of the hyperboloidal mirror and the perspective projection image plane is calculated according to following expression (8). The control section 30 performs the image transformation step 51 (FIG. 5) so as to create the second perspective projection image data based on the calculated distance d2.

$$d2 = D2 \times n1 \qquad (8)$$

Referring again to FIG. 9, in step 6, the control section 30 performs the image combining step 54 (FIG. 5) so as to create a bird's eye view image schematically showing a overhead view of the car. The created bird's eye view image is stored in the seventh storage region 36g of the image data storage section 36.

Figure 12:
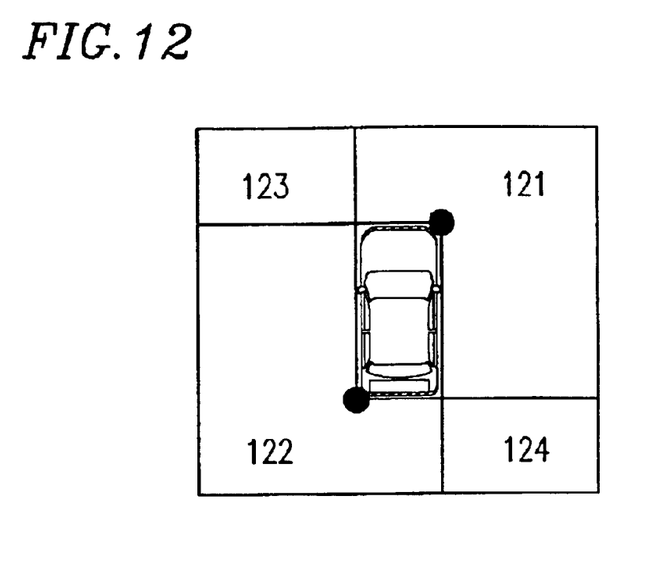
FIG. 12 is a schematic view showing regions in which perspective projection images are pasted (combined) when a bird's eye view image is created in an image combining step.

FIG. 12 is a schematic bird's eye view image created in the image combining step 54.

In the image combining step 54, the scale model of the car stored in the fifth storage region 36e of the image data storage section 36 is pasted (combined) at a center of the bird's eye view image. The first perspective projection image data based on the input image data captured by the first omnidirectional vision sensor 31, i.e., the first perspective projection image data corresponding to the first region 121, is partially pasted in a first region 121 shown in FIG. 12. Further, the second perspective projection image data based on the input image data captured by the second omnidirectional vision sensor 32, i.e., the second perspective projection image data corresponding to the second region 122, is partially pasted in a second region 122 shown in FIG. 12.

Either of the first perspective projection image data based on the input image data captured by the first omnidirectional vision sensor 31 or the second perspective projection image data based on the input image data captured by the second omnidirectional vision sensor 32, i.e., either of the first perspective projection image data corresponding to the first region 121 or the second perspective projection image data corresponding to the second region 122, is pasted in third and fourth regions 123 and 124 shown in FIG. 12. Alternatively, a background image is pasted in the third and fourth regions 123 and 124.

When a driver of the car wants to display a gauge model on the monitor, the driver operates the input section 34 so as to input to the control section 30 image data of the gauge model stored in the sixth storage region 36f of the image data storage section 36 and allow the control section 30 to perform the image combining step 54, so that the gauge model is pasted (combined) on the bird's eye view image.

In this case, the gauge model can be displayed anywhere in the bird's eye view image and a position of the gauge model can be freely changed by operating the input section 34. Also, a direction of the gauge model can be freely changed through the input section 34.

Figure 13:
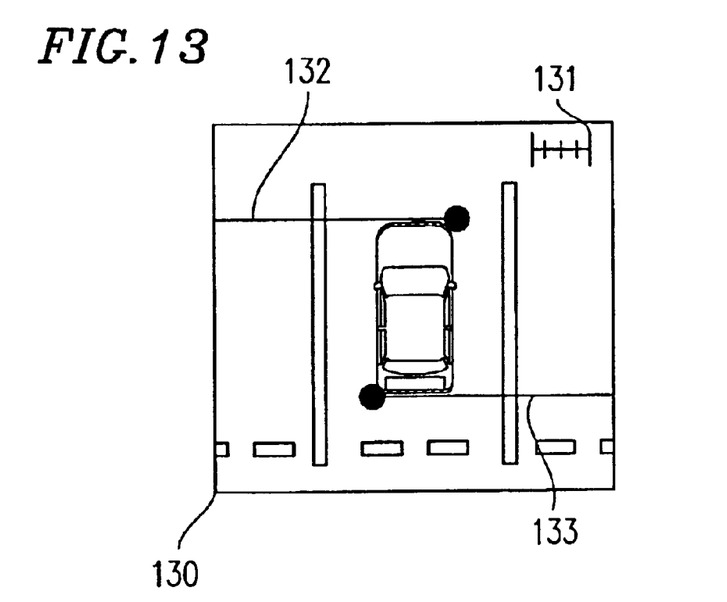
FIG. 13 is a schematic view of a complete bird's eye view image.

FIG. 13 is a schematic view showing the complete state of a bird's eye view image 130 created in the above-described method. The bird's eye view image 130 is stored in the seventh storage region 36g of the image data storage section 36 and is displayed on a display screen (monitor) by the display section 35. By operating the input section 34, it is possible to display in the bird's eye view image 130 the gauge model 131 and a boundary 132 between an image captured by the first omnidirectional vision sensor 31 and an image captured by the second omnidirectional vision sensor 32.

Figure 9:
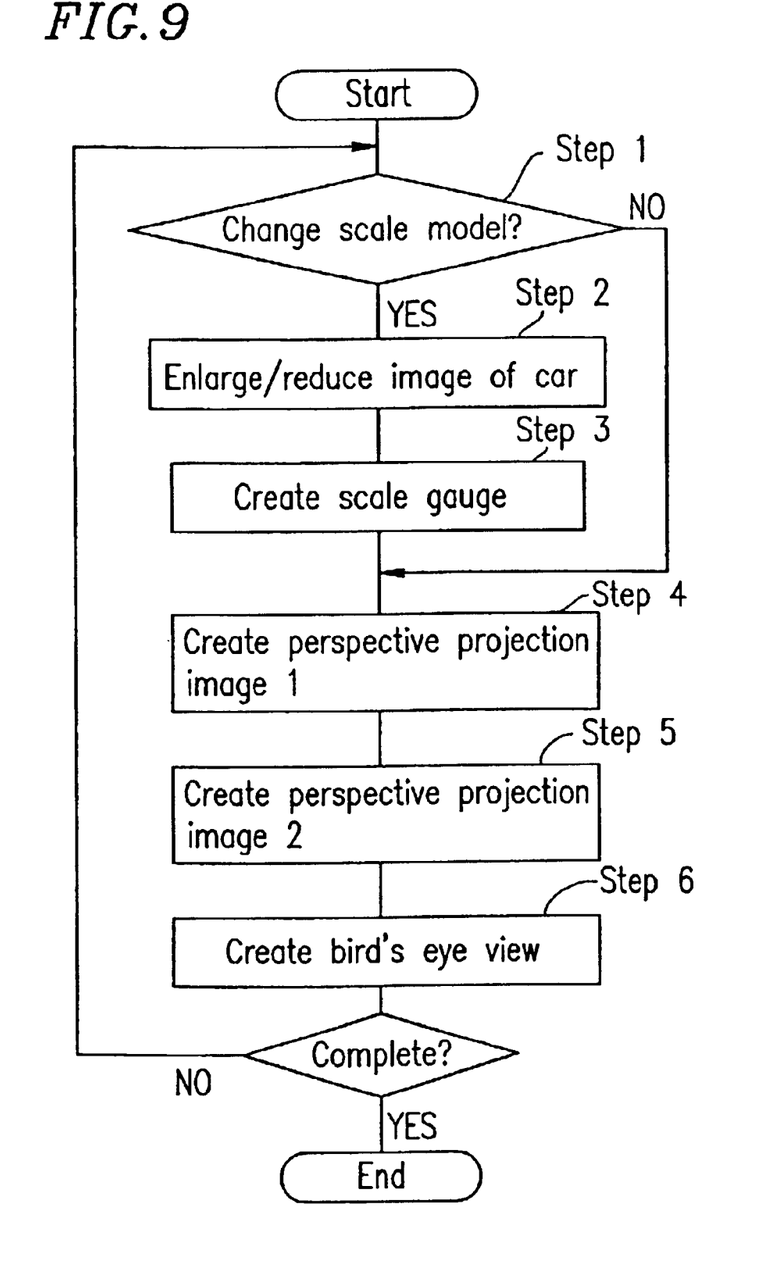
FIG. 9 is a flowchart showing a procedure for creating a bird's eye view image.

By repeating steps 1 through 6 of FIG. 9, bird's eye view images, as shown in FIG. 13, are successively created, i.e., the created bird's eye view image varies with time, and are successively displayed on a display screen. Thus, a driver of the car can precisely grasp the surroundings of the car in real time by viewing the displayed bird's eye view image.

In the operation of the flowchart of FIG. 9, in the case where there are no changes to the parameters due to operations such as zooming-in, zooming-out, etc., it is not necessary to change the scale model of the car each time the perspective projection image is created. Thus, the operation proceeds to step 4 where the perspective projection image is created without performing step 2 where the scale model of the car is created and step 3 where the gauge model is created.

The control section 30 according to this embodiment of the present invention performs programmed steps 51 through 54 of image transformation, image enlargement/reduction, scale gauge creation, and image combining, respectively. By making hardware, such as dedicated ICs, to perform the programmed steps 51 through 54 or by using a computer readable recording medium storing a program for carrying out steps 51 through 54, a processing speed of the steps can be significantly improved, thereby stably and constantly providing a real-time bird's eye view image to the driver.

The perspective projection image creation system according to the present invention can be used for creating a bird's eye view for a mobile body surround surveillance system disclosed in Japanese Patent Application No. 2000-31260. In the perspective projection image creation system of the present invention, for example, when the driver backs up (reverses) a car including the omnidirectional vision sensors, information representing that the car is in a reverse gear is sent to a control section for controlling the main processing in the car, and the control section, responsive to the information, judges whether the car is in a reverse gear and the procession by the control section is shifted from the main processing routine to the bird's eye view processing routine. In this case, the driver can operate the input section based on their judgment and input information for instructing the control section to display a bird's eye view image, such that the operation of the control section is shifted from the main processing routine to the bird's eye view processing routine.

As described above, the present invention provides a perspective projection image creation system in which a scale model of a target object corresponding to a size of a perspective projection image is provided by using a ratio of a distance between a focal point of an optical system including a hyperboloidal mirror and a surface of the target object and a distance between the focal point of the hyperboloidal mirror and a perspective projection image plane, and the scale model is displayed together with the perspective projection image, so that the driver can readily grasp positional relationships between the car and target objects, a distance from the car to the target objects, etc. For example, by applying the perspective projection image creation system of the present invention to an omnidirectional vision system for use in a car which assists a driver of the car, it is possible to reduce a driver's burden when parking the car or driving the car through narrow streets.

Various other modifications will be apparent to and can be readily made by those skilled in the art without departing from the scope and spirit of this invention. Accordingly, it is

What is claimed is:

1. A perspective projection image creation system, comprising:
   an optical system including a hyperboloidal mirror which has a hyperboloidal shape of one sheet of a two-sheeted hyperboloid;
   an imaging section receiving light concentrated by a lens opposed to the hyperboloidal mirror so as to create input image data;
   an image transformation section transforming input image data obtained by the imaging section into image data of a perspective projection having a projection center at a focal point of the hyperboloidal mirror;
   a scale model creation section transforming image data for an object in an object plane perpendicular to a line extending through a focal point of the hyperboloidal mirror into image data for a scale model of the object, based on a ratio of a distance between the focal point of the hyperboloidal mirror and the object plane to a distance between the focal point of the hyperboloidal mirror and a perspective projection image plane, such that a size of the scale model of the object corresponds to that of the object in a perspective projection image;
   an image combining section creating combined image data created by combining the perspective projection image data and the image data for the scale model; and
   a display section displaying the combined image data.

2. A perspective projection image creation system according to claim 1, wherein the object plane is a ground plane.

3. A perspective projection image creation system according to claim 1, wherein the distance between the projection center and the perspective projection image plane is represented by the number of pixels each of which represents a minimum unit of resolution of an image.

4. A perspective projection image creation system according to claim 1, wherein the image data of the scale model is created based on information with respect to a target object for the scale model in the object plane.

5. A perspective projection image creation system according to claim 4, wherein the information includes original image data, which is the image data for the target object, an actual size of the target object, and data with respect to the distance between the focal point of the hyperboloidal mirror and the object plane.

6. A perspective projection image creation system according to claim 1, wherein the scale model creation section creates the image data of the scale model by enlarging/reducing a size of the original image data, which is the image data for a target object, based on the ratio of the distance between the focal point of the hyperboloidal mirror and the object plane to the distance between the focal point of the hyperboloidal mirror and a perspective projection image plane.

7. A perspective projection image creation system according to claim 1, further comprising a second optical system similar to the first optical system, the system creating perspective projection image data, which has a projection center at a focal point of a hyperboloidal mirror in the second optical system and corresponds to the scale model, by calculating a distance between the focal point of the hyperboloidal mirror in the second optical system and a perspective projection image plane having a projection center at the focal point in the second optical system based on the image data for the scale model created by the scale model creation section.

8. A perspective projection image creation system according to claim 1, wherein the image data for the scale model is a gauge model representing a length in an image.

9. A method for creating a perspective projection image, comprising the steps of:
   obtaining input image data using an omnidirectional vision sensor, the omnidirectional sensor including an optical system which includes a hyperboloidal mirror having a hyperboloidal shape of one sheet of a two-sheeted hyperboloid and the omnidirectional sensor including an imaging section which receives light concentrated by a lens opposed to the hyperboloidal mirror so as to obtain input image data;
   transforming input image data obtained by the imaging section into image data of a perspective projection having a projection center at a focal point of the hyperboloidal mirror;
   creating a scale model by transforming image data for an object in an object plane perpendicular to a line extending through a focal point of the hyperboloidal mirror into image data for a scale model of the object, based on a ratio of a distance between the focal point of the hyperboloidal mirror and the object plane to a distance between the focal point of the hyperboloidal mirror and a perspective projection image plane, such that a size of the scale model of the object corresponds to that of the object in a perspective projection image;
   combining the perspective projection image data and the image data for the scale model so as to create combined image data created; and
   displaying the combined image data.

10. A perspective projection image creation program for carrying out the method for creating perspective projection image according to claim 9.

11. A computer readable recording medium storing a perspective projection image creation program for carrying out the method for creating a perspective projection image according to claim 9.

* * * * *